(12) United States Patent
Green et al.

(10) Patent No.: US 6,894,485 B2
(45) Date of Patent: May 17, 2005

(54) POSITION SENSING BY MEASURING INTENSITY OF MAGNETIC FLUX PASSING THROUGH AN APERTURE IN A MOVABLE ELEMENT

(75) Inventors: Alan H. Green, Germantown, OH (US); Manuel A. Quintana, Joaquin de Casasus (MX)

(73) Assignee: Delphi Technologies, Inc., Troy, MI (US)

( * ) Notice: Subject to any disclaimer, the term of this patent is extended or adjusted under 35 U.S.C. 154(b) by 174 days.

(21) Appl. No.: 10/361,662

(22) Filed: Feb. 10, 2003

(65) Prior Publication Data

US 2004/0155647 A1 Aug. 12, 2004

(51) Int. Cl.[7] .................................................. G01R 7/14
(52) U.S. Cl. .............................. 324/207.2; 324/207.24; 324/207.22
(58) Field of Search ......................... 324/207.2, 207.21, 324/207.22, 207.24, 207.25; 338/32 R, 32 H

(56) References Cited

U.S. PATENT DOCUMENTS

| | | |
|---|---|---|
| 4,107,604 A | 8/1978 | Bernier |
| 4,268,814 A | 5/1981 | Henrion et al. |
| 4,471,304 A | 9/1984 | Wolf |
| 5,115,186 A | 5/1992 | Reinartz et al. |
| 5,264,896 A | 11/1993 | Lee et al. |
| 5,321,355 A | 6/1994 | Luetzow |
| 5,373,740 A | 12/1994 | Yoshida et al. |
| 5,670,876 A | 9/1997 | Dilger et al. |
| 5,955,881 A | 9/1999 | White et al. |
| 6,057,682 A | 5/2000 | McCurley et al. |
| 6,175,233 B1 | 1/2001 | McCurley et al. |
| 6,215,299 B1 | 4/2001 | Reynolds et al. |
| 6,310,472 B1 | 10/2001 | Chass |
| 6,400,145 B1 | 6/2002 | Chamings et al. |
| 6,424,896 B1 | 7/2002 | Lin et al. |
| 6,426,619 B1 | 7/2002 | Pfaffenberger et al. |
| 6,457,545 B1 | 10/2002 | Michaud et al. |
| 6,576,890 B2 | 6/2003 | Lin et al. |
| 6,577,123 B2 | 6/2003 | Schroeder et al. |
| 6,590,385 B2 | 7/2003 | Valles |
| 6,690,158 B2 * | 2/2004 | Saito et al. ............. 324/207.21 |

* cited by examiner

Primary Examiner—Jay Patidar
(74) Attorney, Agent, or Firm—Michael D. Smith

(57) ABSTRACT

An apparatus and method are provided for sensing the position of a point of contact through use of a sensor having a movable element, disposed between a sensing element and a source of magnetic flux, and having an aperture therein for allowing a portion of the magnetic flux from the source of magnetic flux to pass through the aperture and impinge on the sensing element. The aperture may have various shapes to provide a desired linear or non-linear relationship between the position of the movable element and the intensity of the flux that passes through the aperture and impinges on the sensing element for a given position of the movable element.

23 Claims, 3 Drawing Sheets

POSITION SENSING BY MEASURING INTENSITY OF MAGNETIC FLUX PASSING THROUGH AN APERTURE IN A MOVABLE ELEMENT

TECHNICAL FIELD OF THE INVENTION

This invention relates to sensing the position of a surface or a datum, and more particularly to position sensors that determine the position and/or motion of a point of contact in relation to the position sensor by detecting the intensity of magnetic flux impinging on a sensing element within the position sensor.

BACKGROUND OF THE INVENTION

In many mechanical devices, it is desirable or necessary to detect the position or movement of a movable member of the device in relation to another part of the mechanical device. It is also desirable in some cases to provide an output electrical signal that is indicative of the current position or movement of the movable member.

One example of such a mechanical device is a brake booster for a vehicle, in which it is desirable to know the position of a movable diaphragm support located inside of the booster, in relation to a housing of the booster that completely encloses the diaphragm support and makes it impossible to view the diaphragm support external to the booster. It may be desirable to know the position of the diaphragm support in a booster to discern driver intent in a controlled brake system, or for providing a remote indication of a problem with the controlled brake system.

One type of position sensor used for such purposes includes a magnetic flux sensing device, such as a Hall-effect sensor, to generate an electrical signal indicative of the intensity of a magnetic flux impinging on the sensing device. The sensing element is typically attached to a housing of the position sensor, along with a source of magnetic flux in the form of a permanent magnet, or an electromagnet. A movable element inside the position sensor has a connection adapted to bear against or be attached to a point of contact on a surface of a part whose position is to be detected. As the movable element moves with the point of contact, the position of the movable element in relation to the sensing element and the source of magnetic flux causes the magnetic flux impinging on the sensing element to vary as a function of the position of the movable element, in a manner that allows the sensing element to generate an electrical signal indicative of the position of the point of contact in relation to the housing of the sensor.

While such position sensors are widely used, there are several areas in which an improved sensor design is desirable. It is sometimes difficult to achieve a true linear relationship between the position of the point of contact and electrical signal generated by the sensing element. Some prior position sensors addressed this problem by incorporating multiple sensing elements into the position sensor itself, or by using complex signal processing circuitry for converting a non-linear signal from the sensing elements into a signal having a linear relationship to the position of the point of contact.

This has been particularly true in position sensors that are required to provide position detection over a wide range of movement, spanning a range of 0.5 to 2.0 inches or more of travel. The use of such additional sensing elements and signal processing circuitry is undesirable because the physical size and cost of the position sensor is significantly increased, and because the additional sensing elements and circuitry create more potential points of failure, thereby reducing the ruggedness and reliability of the sensor.

What is needed, therefore, is an improved position sensor, and a method of sensing position, that provide a solution to one or more of the problems described above.

SUMMARY OF THE INVENTION

Our invention provides an improved position sensor and method for sensing the position of a point of contact through use of a sensor having a movable element, disposed between a sensing element and a source of magnetic flux, and having an aperture therein for allowing a portion of the magnetic flux from the source of magnetic flux to pass through the aperture and impinge on the sensing element. The aperture may have various shapes to provide a desired linear or non-linear relationship between the position of the movable element and the intensity of the flux that passes through the aperture and impinges on the sensing element for a given position of the movable element.

In one form of our invention, a position sensor includes a housing defining an axis of motion. A movable element, a sensing element and a magnet are attached to the housing. The movable element is formed of a ferromagnetic material, and is mounted in the housing for movement along the axis of motion. The movable element includes an aperture extending through the movable element in a direction transverse to the axis of motion, and has a connection thereof adapted for receiving a positional input from a point of contact. The sensing element is fixedly attached to the housing adjacent one side of the movable element for sensing magnetic flux passing through the aperture, and the magnet is fixedly attached to the housing adjacent an opposite side of the movable element.

The movable element may have a width transverse to the axis of motion that varies in a linear or non-linear manner along the axis of motion, with respect to motion of the point of contact, to produce a corresponding desired change in intensity of magnetic flux impinging on the sensing element. The sensing element may be a single Hall-effect sensor, generating an electrical output signal indicative of the intensity of magnetic flux impinging on the sensing element. The magnet may also have a shape that enhances performance of the sensor in a manner that obviates the need for additional sensing elements and signal processing circuitry.

Our invention may also take the form of a method for sensing the position of a point of contact by directing magnetic flux from a source of magnetic flux through an aperture in a movable element of ferromagnetic material operatively attached to the point of contact for movement therewith and onto a sensing element for determining an intensity of a magnetic flux impinging on the sensing element. The method may also include generating an output signal indicative of the intensity of the magnetic flux impinging on the sensing element.

The foregoing and other features and advantages of our invention will become further apparent from the following detailed description of exemplary embodiments, read in conjunction with the accompanying drawings. The detailed description and drawings are merely illustrative of the invention rather than limiting, the scope of the invention being defined by the appended claims and equivalents thereof.

DETAILED DESCRIPTION

Figure 1:
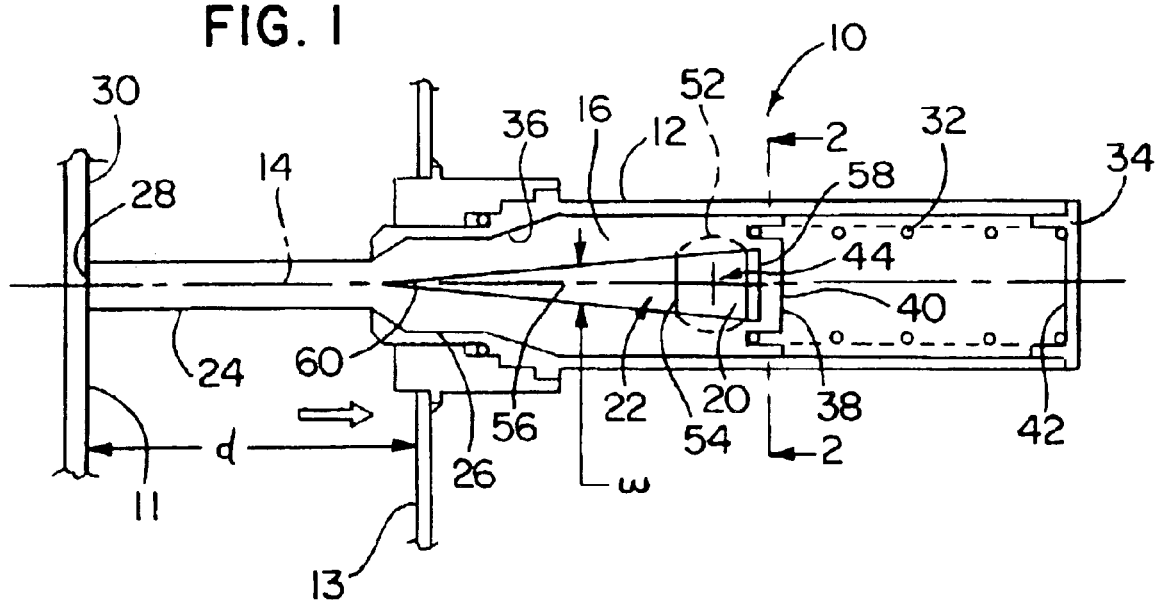
FIG. 1 is a longitudinal cross section of an exemplary embodiment of a position sensor according to our invention, in the form of a linear position sensor.
Figure 2:
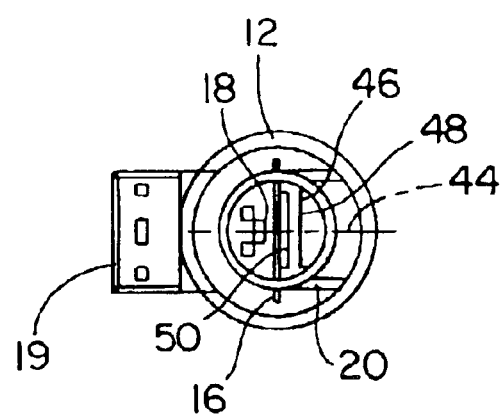
FIG. 2 is a transverse cross section position sensor of FIG. 1, taken along lines 2—2 of FIG. 1, showing internal components of the sensor.

FIGS. 1 and 2 depict a first exemplary embodiment of a position sensor 10, having a housing 12 defining an axis of motion 14. A movable element 16, a sensing element 18, and a magnet 20 are operatively attached to the housing 12 in the manner described in greater detail below, for measuring a linear position 'd' of a point of contact 28 on a translating wall 11, in relation to a fixed wall 13, to which the position sensor 10 is mounted.

It should be noted that the terms "translating wall" and "fixed wall" are used herein for illustrative purposes in explaining our invention. Our sensor may be used for sensing relative movement or position of one body to another, i.e. not just walls. Also, in other embodiments contemplated within the scope of the appended claims, the sensor may be attached to a movable body, rather than a fixed body as is the case in the exemplary embodiment disclosed herein, with the point of contact being on either a movable or a fixed body.

Figure 3:
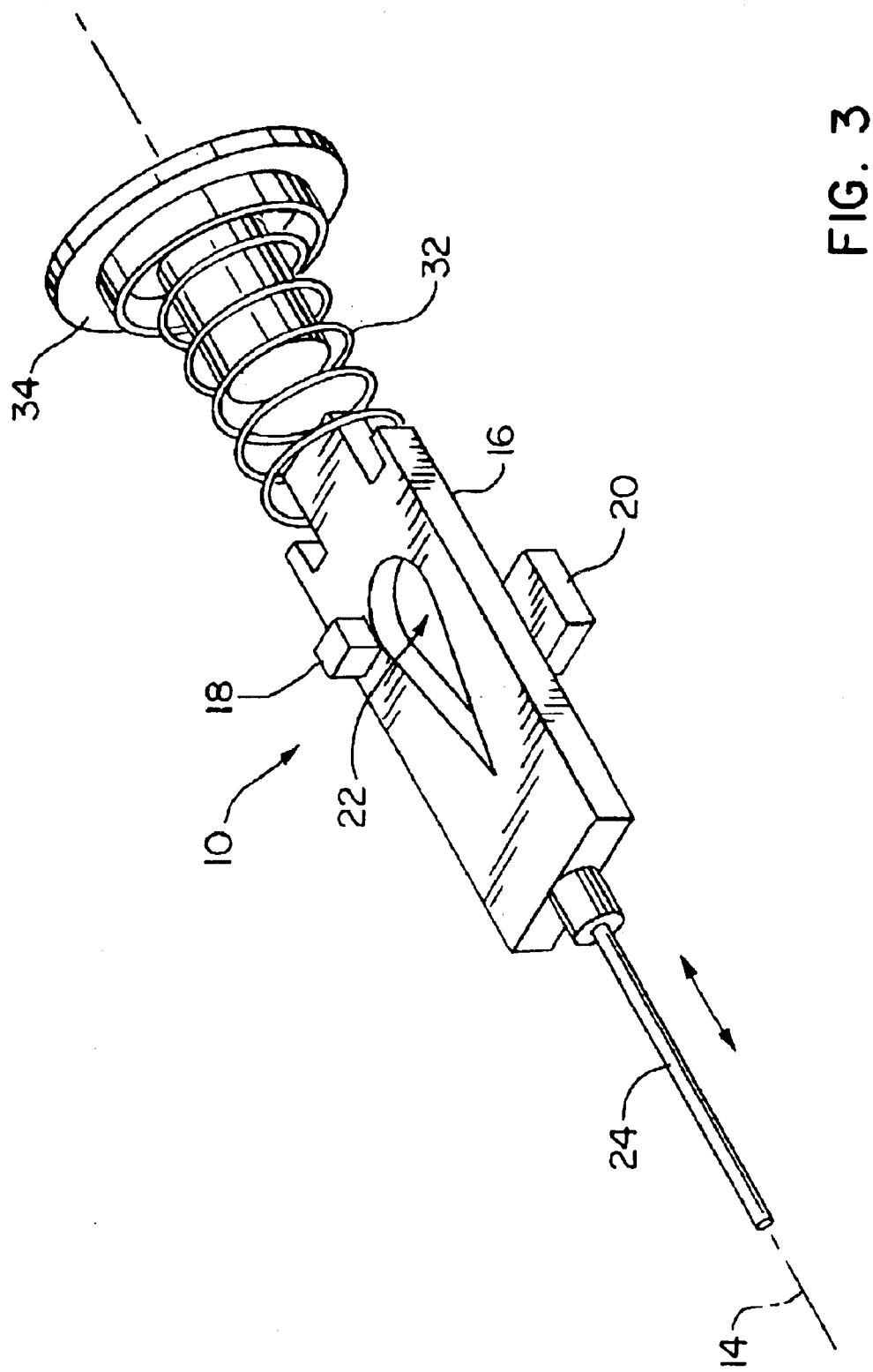
FIG. 3 is an exploded view of the internal components of an exemplary position sensor, according to our invention.

FIG. 3 is an exploded perspective view of the internal elements of a second embodiment of a position sensor 10 having some differences, as explained below, from the sensor 10 of FIGS. 1 and 2. The same reference numerals are used for similar elements in the following descriptions of the first and second exemplary embodiments, as shown in FIGS. 1–3.

The movable element is configured as a vane 16 of ferromagnetic material mounted in the housing 12 for sliding movement along the axis of motion 14. The vane 16 includes an aperture 22 extending through the vane 16 in a direction transverse to the axis of motion 14. A connection, in the form of pin 24, extends from a first axial end 26 of the vane 16 and out of the housing 12 for receiving a positional input from a point of contact 28 with a surface 30 of a translating wall 11 external to the sensor 10.

The sensing element 18 is fixedly attached to the housing 12 adjacent one side of the vane 16 for sensing magnetic flux passing through the aperture 22. In the exemplary embodiments shown, the sensing element is preferably a Hall-effect sensor 18, configured to measure flux impinging on the sensing element 18 in a direction generally normal to the axis of motion 14. The Hall-effect sensor 18 produces an electrical output signal indicative of the intensity of the magnetic flux impinging on the sensing element 18, and delivers the output signal to an external circuit through an electrical connector 19 attached to the outside of the housing 12.

A helical compression spring 32 is operatively attached between an end cap 34 of the housing 12 and the vane 16, for urging the vane 16 to return to an initial position along the axis of motion 14, at a left end of the housing 12 as depicted in FIGS. 1 and 2. The first axial end 26 of the vane 16 is configured to rest against an inner wall 36 of the housing 12, when the vane 26 is held in the initial position by the spring 32. The opposite end 38 of the vane 16 is configured to receive the spring 32 and includes a stop portion 40 thereof that bears against a stop surface 42 of the end cap 34, for limiting the maximum travel of the vane 16 within the housing 12 along the axis of motion 14.

The magnet 20 is fixedly attached to the housing 12 adjacent an opposite side of the vane 16. In the exemplary embodiment shown in FIG. 1, the magnet 20 is a permanent magnet, and defines a magnetic flux axis 44, extending from the magnet 20 and aligned to pass through the aperture 22, during movement of the vane 16 along the axis of motion 14. The magnet 20 in the exemplary embodiment of FIGS. 1 and 2, has a flat planar body 46 defining oppositely facing first and second faces 48, 50 of the magnet 20 extending normal to the magnetic flux axis 44. The magnet 20 has a generally circular outer perimeter 52 disposed about the magnetic flux axis 44. The outer periphery 52 defines a flat portion 54 thereof extending normal to the flux axis 44, and oriented transverse to the axis of motion 14.

As shown in FIG. 3, the magnet 20 of the second exemplary embodiment of a linear position sensor 10 has a flat planar body with a periphery that is rectangular, rather than circular as is the case for the magnet 20 of the first embodiment shown in FIGS. 1 and 2. The shape of the magnet 20 has an effect on the linearity of an output signal generated by the sensing element 18, and can be judiciously selected to fine tune the performance of the position sensor 10 in a manner that is desirable for various embodiments of our invention.

The aperture 22 in the vane 16 has a width 'w' transverse to the axis of motion 14 that varies along the axis of motion 14. The width 'w' can vary in either a linear or a non-linear manner along the axis of motion 14, to allow the intensity of the magnetic flux passing through the aperture from the magnet 20 to the sensing element 18 to vary in relation to the position 'd' in a manner that produces a desired relationship between the position 'd' and the output electrical signal produced by the sensing element 18.

Figure 4A:
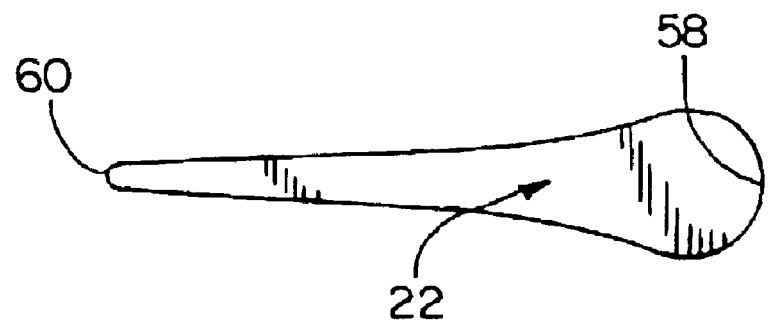
FIGS. 4a and 4b show alternate configurations of the shape of an aperture in a movable element of a position sensor, according to our invention.

In the exemplary embodiments shown in FIGS. 1–3, the aperture 22 is elongated along a longitudinal axis 56 of the aperture 22, extending generally parallel to the axis of motion 14 from a first end 58 to a second end 60 of the aperture 22, at opposite ends of the longitudinal axis 56 of the aperture 22, and the width 'w' of the aperture 22 tapers inward from the first end 58 to the second end 60 of the aperture 22. In the embodiment shown in FIG. 1, the sides of the aperture 22 between the first and second ends 58, 60 of the aperture 22 are straight, thereby providing a perimeter of the aperture 22 that is generally triangular shaped. In the embodiment depicted in FIG. 3, the sides of the aperture 22 between the first and second ends 58, 60 of the aperture 22 are curved inward, thereby providing a perimeter of the aperture 22 that is generally teardrop shaped, as shown in FIG. 4a.

Figure 4B:
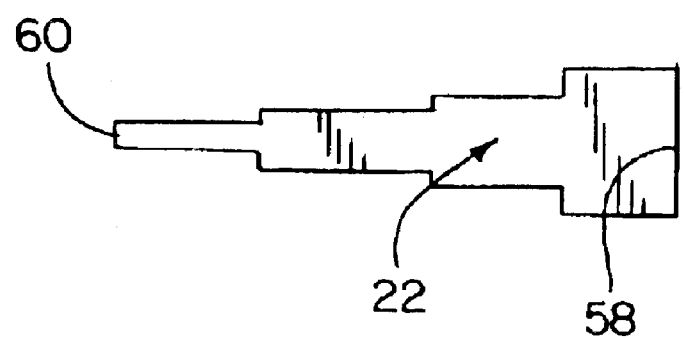

In other embodiments, contemplated within the scope of our invention, the sides of the aperture 22 may be curved in another manner, or may be stepped, as shown in FIG. 4b. The shape of the aperture 22 has a significant effect on the relationship between the amount of magnetic flux that passes through the aperture 22 and impinges on the sensing element 16 as a function of the position 'd' of the point of contact 28. Multiple apertures may also be used for generating a digital output signal.

While the embodiments of our invention disclosed herein are presently considered to be preferred, various changes and modifications can be made without departing from the spirit and scope of the invention. For example, other types of magnetic sensing elements may be used, and the magnet may be an electromagnet rather than a permanent magnet.

It is also contemplated that the movable element of a sensor according our invention may be configured as a disk with an aperture extending along a circumferentially axis of the aperture that turns about a rotational axis to provide a sensor that measures rotational or angular movement. The movable element may also be cylindrical in shape, and capable of both rotational and longitudinal movement. The aperture may also taper in the opposite direction from what is shown in FIGS. 1–3.

The connection of the movable element to the point of contact may be made at any point on the movable element, for example on a side or top surface of the movable element, rather than at one axial end as shown in the exemplary embodiment shown in FIGS. 1–3. The connection between the vane and the point of contact may also be made directly or indirectly in a virtually unlimited number of ways using a cable or other tension elements, fasteners, and various mechanical, fluid, magnetic or electrical coupling elements, rather than the pin bearing against the point of contact shown in the exemplary embodiment of FIGS. 1–3.

Those having skill in the art will also appreciate that a single position sensor 10, as described herein may be used in a variety of applications having different length of travel requirements by substituting a vane 16 having a shorter or longer aperture 22. The pin 24 may be attached to the point of contact 28, and the spring 32 may be oriented to urge the vane to move in the opposite direction along the axis of motion back to an initial position that is fully compressed, rather than fully extended as shown in FIGS. 1–3. The spring may be provided in a number of other forms including, for example, a torsion spring, a leaf spring, a bellows, or as an element formed from a compressive or stretchable elastomer.

The scope of the invention is indicated in the appended claims, and all changes or modifications within the meaning and range of equivalents are intended to be embraced therein.

We claim:

1. A position sensor comprising:
 a housing defining an axis of motion;
 a movable element of ferromagnetic material mounted in the housing for movement along the axis of motion and having an aperture extending through the movable element in a direction transverse to the axis of motion, the movable element further having a connection thereof adapted for receiving a positional input from a point of contact;
 a sensing element fixedly attached to the housing adjacent one side of the movable element for sensing magnetic flux passing through the aperture; and
 a magnet fixedly attached to the housing adjacent an opposite side of the movable element.

2. The position sensor of claim 1 wherein the aperture in the movable element has a width transverse to the axis of motion that varies along the axis of motion.

3. The position sensor of claim 2 wherein the width varies linearly along the axis of motion.

4. The position sensor of claim 2 wherein the width varies non-linearly along the axis of motion.

5. The position sensor of claim 2 wherein the aperture is elongated along a longitudinal axis of the aperture extending generally parallel to the axis of motion between a first end and a second end of the aperture and the width of the aperture is stepped between the first and second ends of the aperture.

6. The position sensor of claim 2 wherein the aperture is elongated along a longitudinal axis of the aperture extending generally parallel to the axis of motion from a first end to a second end of the aperture and the width of the aperture tapers from the first end to a second end of the aperture.

7. The position sensor of claim 6 wherein the sides of the aperture between the first and second ends of the aperture are straight, thereby providing a perimeter of the aperture that is generally triangular shaped.

8. The position sensor of claim 6 wherein the sides of the aperture between the first and second ends of the aperture are curved.

9. The position sensor of claim 6 wherein the sides of the aperture between the first and second ends of the aperture are curved inward, thereby providing a perimeter of the aperture that is generally teardrop shaped.

10. The position sensor of claim 1 wherein the sensing element is a Hall-effect sensor.

11. The position sensor of claim 1 wherein the magnet is a permanent magnet.

12. The position sensor of claim 1 wherein the magnet defines a magnetic flux axis extending from the magnet aligned to pass through the aperture during at least a portion of the movement of a vane along the axis of motion.

13. The position sensor of claim 12 wherein the magnet has a flat planar body defining oppositely facing first and second faces of the magnet extending normal to the magnetic flux axis.

14. The position sensor of claim 13 wherein the magnet has a generally circular perimeter disposed about the magnetic flux axis.

15. The position sensor of claim 14 wherein the generally circular perimeter includes a flat portion of the outer periphery of the magnet, the flat portion extending normal to the flux axis.

16. The position sensor of claim 15 wherein the flat portion of the magnet is oriented transverse o the axis of motion.

17. The position sensor of claim 1 further comprising a spring operatively attached between the housing and a vane for urging the vane to return to so initial position along the axis of motion.

18. A position sensor comprising:
 a housing,
 a sensing element attached to the housing for sensing an intensity of a magnetic flux impinging on the sensing element and generating an output signal indicative of the intensity of the magnetic flux impinging on the sensing element;
 a source of magnetic flux attached to the housing for generating a magnetic flux impinging on the sensing element; and
 a movable element of ferromagnetic material operatively attached to the housing for movement relative thereto and having a connection thereof adapted for receiving an input from a point of contact, the movable element disposed between the sensing element and the source of magnetic flux and having an aperture therein for allowing a portion of the magnetic flux from the source of magnetic flux to pass through the orifice and impinge on the sensing element.

19. The position sensor of claim 18 wherein the output signal is linearly related to a change of position of the movable element relative to the housing.

20. The position sensor of claim 18 wherein the aperture is shaped to allow passage of the magnetic flux in a pre-determined non-linear relationship to a linear motion of the point of contact.

21. The position sensor of claim 18 wherein the aperture is shaped to allow passage of the magnetic flux in a pre-determined linear relationship to a non-linear motion of the point of contact.

22. A method for sensing position of a point of contact, the method comprising directing magnetic flux from a source of magnetic flux through an aperture in a movable element of ferromagnetic material operatively attached to the point of contact for movement therewith and onto a sensing element for determining an intensity of a magnetic flux impinging on the sensing element.

23. The method of claim 22 further comprising generating an output signal indicative of the intensity of the magnetic flux impinging on the sensing element.

* * * * *